(12) United States Patent
Atli et al.

(10) Patent No.: US 11,465,056 B2
(45) Date of Patent: Oct. 11, 2022

(54) GAME MEDIATION COMPONENT FOR ENRICHING MULTIPLAYER GAMING SESSIONS

(71) Applicant: Bunch Live, Inc., San Francisco, CA (US)

(72) Inventors: Selcuk Atli, San Francisco, CA (US); Jason Liang, Toronto (CA); Jordan Howlett, Toronto (CA)

(73) Assignee: Bunch Live, Inc., New York, NY (US)

( * ) Notice: Subject to any disclaimer, the term of this patent is extended or adjusted under 35 U.S.C. 154(b) by 66 days.

(21) Appl. No.: 16/843,836

(22) Filed: Apr. 8, 2020

(65) Prior Publication Data

US 2020/0230504 A1 Jul. 23, 2020

Related U.S. Application Data

(63) Continuation-in-part of application No. 16/246,418, filed on Jan. 11, 2019, now Pat. No. 10,953,318.
(Continued)

(51) Int. Cl.
*A63F 13/79* (2014.01)
*A63F 13/35* (2014.01)
(Continued)

(52) U.S. Cl.
CPC .............. *A63F 13/79* (2014.09); *A63F 13/35* (2014.09); *A63F 13/537* (2014.09); *A63F 13/87* (2014.09)

(58) Field of Classification Search
CPC ........ A63F 13/79; A63F 13/35; A63F 13/537; A63F 13/87
See application file for complete search history.

(56) References Cited

U.S. PATENT DOCUMENTS 8,888,592 B1 * 11/2014 Pereira .................... A63F 13/53
463/35
9,713,765 B2 * 7/2017 Jung ..................... A63F 13/216
(Continued)

FOREIGN PATENT DOCUMENTS

KR 10-2018-0077355 A 7/2018

OTHER PUBLICATIONS

Empson, Rip. Overwolf Partners With Teamspeak To Give Online Games A Social Boost (And In-Game Voice Chat. techcrunch.com. Online. Dec, 14, 2011. Accessed Oct. 22, 2021. <URL: https://techcrunch.com/2011/12/14/overwolf-partners-with-teamspeak-to-give-online-games-a-social-boost-and-in-game-voice-chat/> (Year: 2011).*

(Continued)

*Primary Examiner* — Thomas J Hong
*Assistant Examiner* — Carl V Larsen
(74) *Attorney, Agent, or Firm* — Fenwick & West LLP

(57) ABSTRACT

Users play electronic games on their client devices, such as smartphones, laptop computers, game consoles, or the like. A game mediation component supplements the electronic games by providing additional functionality for group gameplay, such as communication among the players participating in the gameplay group, emphasizing key moments in the gameplay, saving and sharing of portions of the group gameplay, etc. Events related to gameplay, such as environmental events or in-game events, cause the game mediation component to take an action to supplement the gameplay, such as modifying an overlay user interface to provide additional gameplay data while efficiently using screen real estate, sending messages to other players in the group gameplay, and saving and sharing portions of gameplay session.

20 Claims, 6 Drawing Sheets

Related U.S. Application Data

(60) Provisional application No. 62/616,972, filed on Jan. 12, 2018.

(51) Int. Cl.
*A63F 13/537* (2014.01)
*A63F 13/87* (2014.01)

(56) References Cited

U.S. PATENT DOCUMENTS

| | | | |
|---|---|---|---|
| 2009/0006604 | A1 | 1/2009 | Dhupelia et al. |
| 2010/0041457 | A1* | 2/2010 | Cook .................. A63F 13/335 463/16 |
| 2012/0283023 | A1 | 11/2012 | O'Kelley, II et al. |
| 2012/0297348 | A1 | 11/2012 | Santoro |
| 2013/0231129 | A1 | 9/2013 | Saville |
| 2013/0296048 | A1 | 11/2013 | Jeffery et al. |
| 2014/0280137 | A1 | 9/2014 | Anderson et al. |
| 2014/0304328 | A1 | 10/2014 | Capati et al. |
| 2015/0261496 | A1 | 9/2015 | Faaborg et al. |
| 2015/0268717 | A1 | 9/2015 | Schlumberger et al. |
| 2015/0328549 | A1 | 11/2015 | Tanaka |
| 2015/0347486 | A1 | 12/2015 | Julia et al. |
| 2016/0166923 | A1 | 6/2016 | Raj |
| 2016/0184712 | A1* | 6/2016 | Colenbrander ....... A63F 13/493 463/29 |
| 2016/0370882 | A1 | 12/2016 | McGrath et al. |
| 2017/0028299 | A1 | 2/2017 | The et al. |
| 2017/0113146 | A1 | 4/2017 | Chung et al. |
| 2017/0136347 | A1 | 5/2017 | Prasad et al. |
| 2017/0157511 | A1 | 6/2017 | Feghali |
| 2017/0266549 | A1* | 9/2017 | Paradise ............. A63F 13/5255 |
| 2017/0266564 | A1 | 9/2017 | Choudhuri |
| 2018/0088792 | A1 | 3/2018 | Klein et al. |
| 2019/0014206 | A1 | 1/2019 | Kuhn et al. |
| 2019/0091544 | A1 | 3/2019 | Huang |
| 2019/0158484 | A1* | 5/2019 | Grunewald ............. A63F 13/73 |

OTHER PUBLICATIONS

Overwolf's TeamSpeak Overlay. Youtube.com. Online. Dec. 11, 2011. Accessed Oct. 22, 2021. <URL: https://www.youtube.com/watch?v=J6AEeypXTDc> (Year: 2011).*

Overwolf API. developers.overwolf.com. Online. Sep. 21, 2017. Accessed via the Internet. Accessed Oct. 22, 2021. <URL: https://web.archive.org/web/20170921182633/http://developers.overwolf.com/documentation/sdk/overwolf/> (Year: 2017).*

Deep linking—Wikipedia, "Deep linking," 2018, 4 pages [Online] [Retrieved Nov. 20, 2018], Retrieved from the internet <URL:https://en.wikipedia.org/wiki/Deep linking >.

United States Office Action, U.S. Appl. No. 16/246,418, dated Jun. 26, 2020, 11 pages.

PCT International Search Report and Written Opinion, PCT Application No. PCT/US2019/013532, dated May 7, 2019, 11 pages.

United States Office Action, U.S. Appl. No. 16/246,418, dated Dec. 10, 2020, 15 pages.

* cited by examiner

GAME MEDIATION COMPONENT FOR ENRICHING MULTIPLAYER GAMING SESSIONS

RELATED APPLICATIONS

This application is a continuation-in-part of U.S. Patent Application Publication No. 2019-0217186, filed on Jan. 11, 2019, which in turn claims the benefit of U.S. Provisional Patent Application Ser. No. 62/616,972, filed Jan. 12, 2018, both of which are incorporated herein by reference.

BACKGROUND

1. Field of the Invention

This invention pertains to the provision of a mechanism for extending the functionality of multiplayer electronic games.

2. Description of the Related Art

Many electronic games allow for multiplayer gameplay where players can play together or compete with one another within a session of the game. Some electronic games allow multiplayer gameplay to involve multiple devices, each running a copy of the game. However, electronic games typically lack a software infrastructure enabling additional types of functionality that enhance gaming sessions, such as the ability to quickly coordinate gameplay sessions, to interact with the other members of such sessions, to save and share memorable moments from past gameplay, and the like. Thus, game players are obliged to rely on external mechanisms that lack context about the game being played, and that thus are extremely cumbersome to use, at best.

SUMMARY

Users play electronic games on their client devices, such as smartphones, laptop computers, game consoles, or the like. A game mediation component supplements the electronic games by providing additional functionality for group gameplay, such as communication among the players participating in the gameplay group, emphasizing key moments in the gameplay, saving and sharing of portions of the group gameplay, and/or the like. In different embodiments and/or different system configurations, the game mediation component may be either a separate application independent of the electronic games, or a software library included within the electronic games (e.g., via static or dynamic linking), or a combination of the two. The game mediation component need not be authored by the same organization that creates any of the electronic games, and is designed to support a wide variety of electronic games, either transparently to the electronic game (e.g., when the game mediation component is a separate application), or with knowledge by the electronic game of the game mediation component (e.g., when the game mediation component is a software library incorporated by the electronic game).

The game mediation component takes game-related actions in response to certain events. If the game mediation component is a separate application independent of the electronic game, the events to which it responds may be "environmental" events (i.e., events to which the game mediation component has access, such as aural, visual, or movement inputs from sensors of the client device). If the game mediation component is a software library incorporated into a particular electronic game, it may additionally respond to "in-game" events (i.e., events defined by the logic of the game itself, the occurrence of which the electronic game must inform the game mediation component, such as a particular player being defeated within the game).

The game-related actions may take various forms in different embodiments. In one embodiment, for example, the actions may include modifying an "overlay" user interface created and managed by the game mediation component, sending messages to other players in the gameplay group, establishing the gameplay group and modifying its list of participant players, and saving and sharing portions of prior gameplay.

The "overlay" user interface created by the game mediation component can be displayed superimposed over the visuals created by the electronic game itself. For example, the overlay user interface can include separate representations of the various player in the group gameplay (e.g., video representations streamed from cameras of the client devices of the various players), visual user interface elements for adjusting volume, sending messages to other players, inviting other players into the group gameplay, and/or the like. The overlay user interface may be displayed at various levels of opacity, or entirely hidden, based on the environmental and/or in-game events. Similarly, the components of the overlay user interface can be dynamically adjusted, such as showing representations of only the most currently relevant subset of the players in the group. This dynamic adjustment can advantageously make the most efficient use of limited screen space of client devices (such as smartphones) by showing only the components of the greatest current relevance.

DETAILED DESCRIPTION

Figure 1:
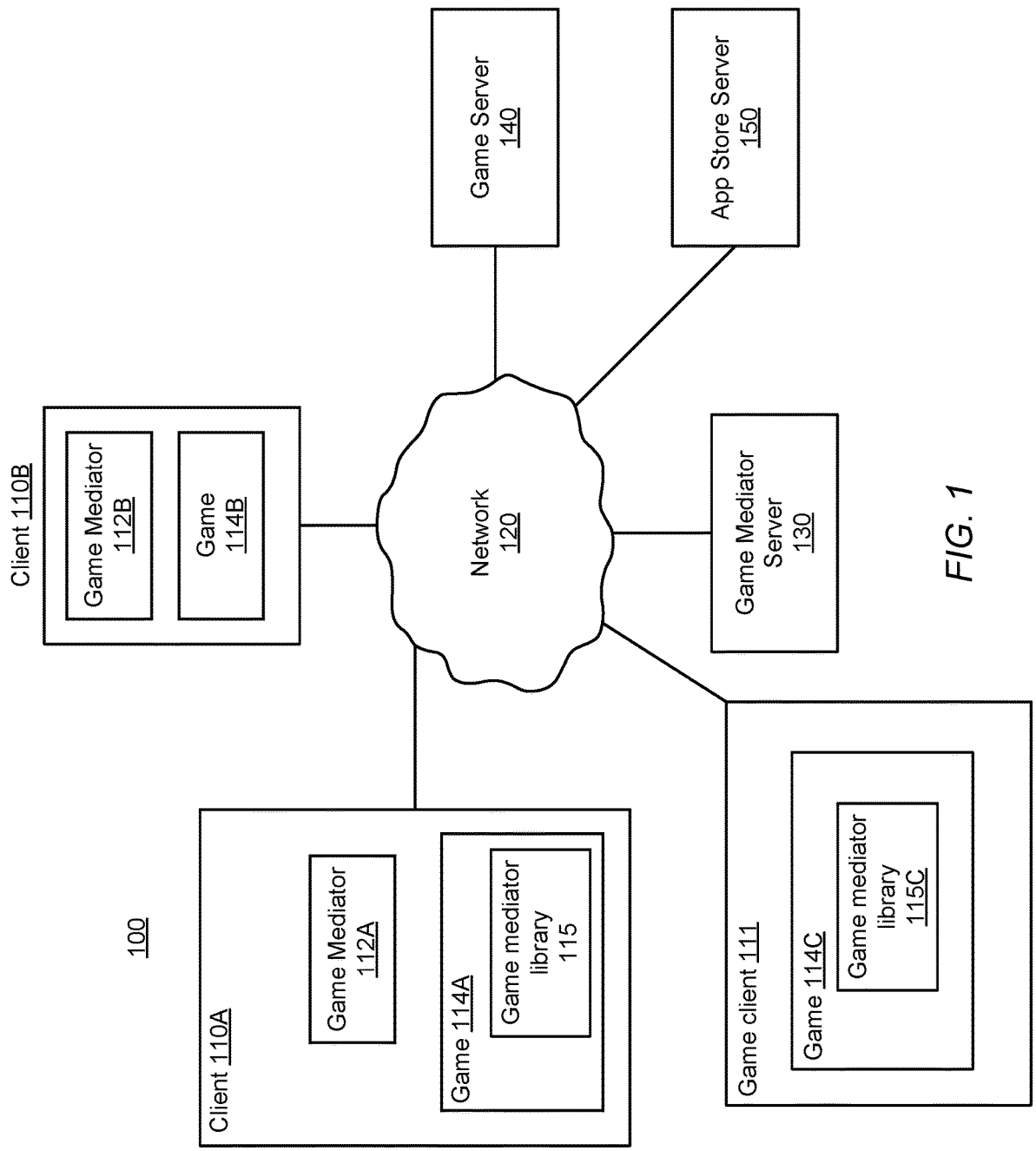
FIG. 1 is a high-level block diagram illustrating an environment in which game mediation takes place, according to one embodiment.

FIG. 1 is a high-level block diagram illustrating an environment 100 in which game mediation takes place, according to one embodiment. FIG. 1 illustrates two clients 110A and 110B, a game mediator server 130, a game server 140, a game client 111, and an app store server 150 connected by a network 120. Only two clients 110, one game mediator server 130, one game client 111, one game server 140, and one app store server 150 are shown in FIG. 1 in order to simplify and clarify the description. Embodiments of the computing environment 100 can have many clients 110, game clients 111, game mediator servers 130, game servers 140, and app store servers 150 connected to the network 120. Likewise, the functions performed by the various entities of FIG. 1 may differ in different embodiments.

FIG. 1 uses like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral. For example, "110" in the text refers to reference numerals "110A" and/or "110B" in the figures.

A client device 110 (or for brevity, simply "client") is an electronic device used by a user to perform functions such as communication with other clients, executing software applications for various purposes, and consuming electronic content such as content hosted by web servers on the network 120. For example, the client may be a smart phone, a tablet computer, a notebook or laptop computer, a desktop computer, or any other computing system on which users may play, and/or interact with, electronic games. The client 110 includes a display on which the user may view content such as electronic games. In addition, the client 110 provides a user interface (UI), such as physical and/or on-screen buttons, which the user may interact with to perform various functions with the client.

In one embodiment, the client 110 includes a game mediator 112 and an electronic game 114, the game mediator 112 facilitating the creation of multiplayer gaming sessions with the electronic game 114 or other electronic games. Depending upon the embodiment, the game mediator 112 and/or game 114 may be integrated into the operating system, or implemented as an application or other software executing on the client 110. In some embodiments, the game 114 is part of the game mediator 112, rather than an independent software item. In other embodiments, the game 114 is distributed among a plurality of locations, for example, in part on the client 110 as an independent software item, and in part on the game server 140.

In some embodiments, the game mediator 112 and the electronic game 114 need not be installed and/or run on the same client 110. Rather, in some embodiments the game 114 may be played on a separate game client device 111 (e.g., a dedicated gaming console, such as NINTENDO SWITCH or the XBOX ONE X, or SONY PLAYSTATION 4, or a general purpose computer such as a laptop or desktop computer running a commercial operating system such as MICROSOFT WINDOWS or APPLE MAC OS). In such embodiments, the game 114 may have or make use of a game mediator library 115, as described in more detail below, or the game client 111 may have a game mediator 112. The game mediator library 115 and/or the game mediator 112 provide the game client device 111 to be part of the game mediation infrastructure. The client device 110 may then be used in conjunction with the game client device 111, with its game mediator 112 serving as an independent means of interacting with the game session established via the game mediation infrastructure, such as by chatting with other game session participants, specifying portions of game sessions to be saved and shared, displaying video of other participants, or the like.

The game mediator 112 is a software module, such as an executable application, that runs on the client 110 (or game client 111) and mediates multiplayer gameplay. The game mediator 112 interacts with one or more games such as the game 114, as well as the game mediator server 130. The "game mediation infrastructure" used to enable game sessions includes at least the game mediator 112 and/or the game mediator library 115, and in some embodiments also includes the game mediator server 130 and/or at least one other game mediator 112 on at least one other client 110. Depending upon the embodiment, the game mediation infrastructure controls various aspects of a group gameplay session, such as providing a "lobby" user interface for establishing and/or configuring the gameplay session, and/or providing enriched gameplay via an "overlay" portion of the lobby user interface during gameplay of the game. In one embodiment, a gameplay session may be launched via a UI of the game mediator 112, such as the lobby, using a "deep link" (a link, such as a Uniform Resource Locator (URL), to a resource such as a game, and that additionally specifies a more specific context within the resource, such as a particular stage or state of the game). In an embodiment, the game mediator 112A runs on a first client 110A and interacts with a second client 110B, such as with a game mediator 112B upon the second client 110B, to enable client 110B to participate in the gameplay session launched by client 110A. In other embodiments, more than one client 110 may be interacted with by the client 110A to enable participation in the gameplay session launched by client 110A, e.g., up to as many as the game being played supports.

The "lobby" is a user interface that provides an environment for communication among clients 110 associated with a gameplay session. The lobby allows clients 110 to communicate before, during, and/or after gameplay sessions, such as by using live video feeds, screen capture feeds, and/or voice. In an embodiment, the lobby has functionality allowing at least one client 110 to configure gameplay settings of the game that is to be launched. In an embodiment, the lobby is executed at least in part upon the game mediator server 130. The lobby may further include various information about the gameplay session, such as usernames or rankings of clients 110 for the game, as well as a level of the game or other information pertaining to the gameplay session. For example, in some embodiments the lobby includes a chatroom in which client 110A exchanges text messages with client 110B. Alternatively or additionally, as another example, in some embodiments the lobby enables a video call (using live video feeds) with which users of clients 110 see and hear each other.

In some embodiments, one or more of the games 114 accesses a game mediator library 115. The game mediator library 115 contains executable code that integrates with the rest of the game mediation infrastructure (e.g., the game mediator 112 and the game mediator server 130) to facilitate the playing of multiplayer games. The game mediator library 115 may be a subset of the functionality provided by the game mediator 112 itself, so that software that incorporates the game mediator library 115 (such as games 114) can perform a subset of the actions of the game mediator 112, even without the game mediator 112 being installed. The game mediator library 115 may be wholly or partially statically linked into the game 114 itself, or the game mediator library may be stored externally to the game and accessed by dynamic linking. In some embodiments, the game mediator library 115 is included within the game mediator 112, so that if the game mediator is installed, the game mediator library is installed, as well. The game mediator 112 and the game mediator library 115 may both be referred to as being part of a game mediation infrastructure that encompasses both the game mediator 112 and the game mediator library 115 on the client devices, as well as the game mediator server 140. The game mediator library 115 may be (though need not be) created by the same organization that creates the game mediator 112 and/or the logic of the game mediator server 130. The game 114 itself may be created by any organization, such as an independent third-party game developer different from the organization creating the game mediator 112 and/or other components of the game mediation infrastructure. In some embodiments, game mediator libraries 115 are not employed, and instead the game mediators 112 themselves provide all the required functionality.

Figure 2:
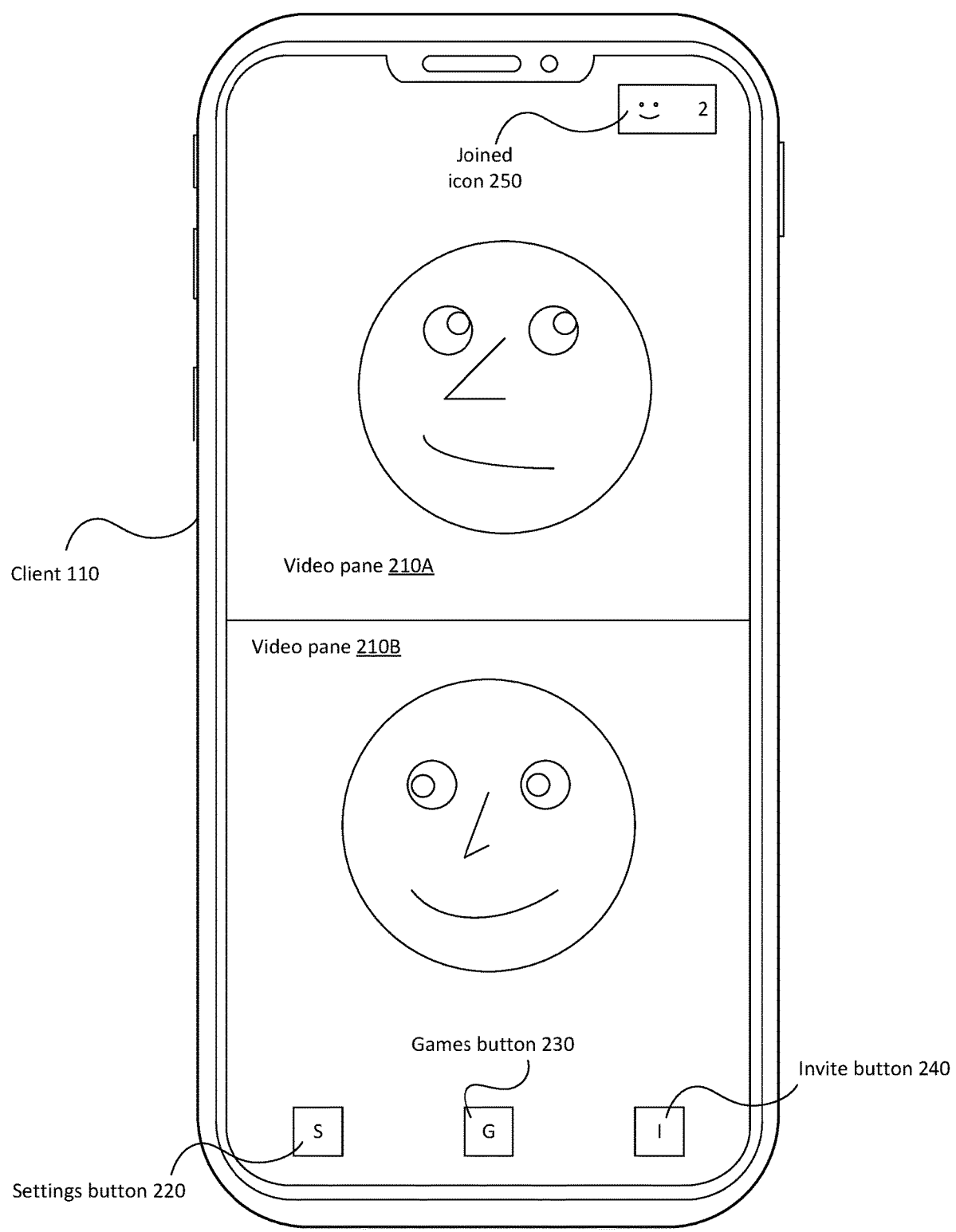
FIG. 2 illustrates a simplified example of the lobby user interface before a particular electronic game has been selected for gameplay, according to one embodiment.
Figure 3:
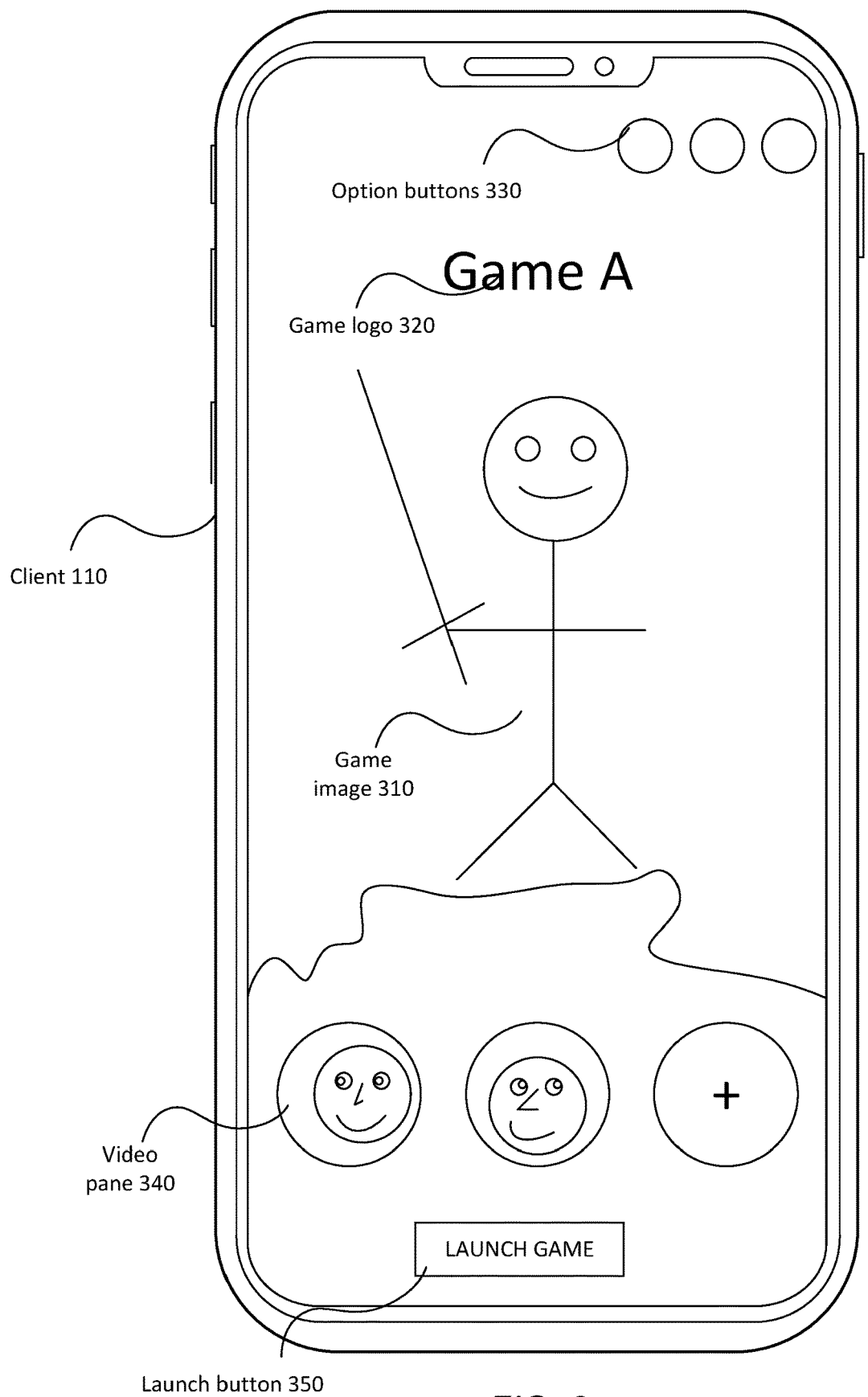
FIG. 3 illustrates a simplified example of a lobby in which a game has been selected, according to one embodiment.

FIG. 2 illustrates a simplified example of the lobby user interface before a particular electronic game has been selected for gameplay, according to one embodiment. In the example of FIG. 2, the lobby includes video panes 210, a settings button 220, a games button 230, an invite button 240, and a joined icon 250. The lobby may provide a user interface such as a page or screen of the game mediator 112, which runs upon client 110, which in the example of FIGS. 2-3 is a mobile device. Each video pane 240 is associated with a client 110 joined to the lobby. For example, if clients 110A and 110B are joined to a lobby, there is a video pane 210A for client 110A and a video pane 210B for client 110B, as in FIG. 3. If additional clients 110 are joined to the lobby, additional panes may be added, which may involve modifying the boundaries of existing panes to accommodate the additional panes on the display. In an embodiment, additional panes are not added if a pane threshold is reached or surpassed. For example, the pane threshold may be a number of panes, or a pane size. Each video pane 210 presents a live video feed from the associated client 110, including both graphical and audio content. The live video feed may be, for example, from a camera of the client 110, e.g., displaying an image of the user of the client (or of whatever is in the field of view of the camera), from the content of the screen of the client (e.g., feed of screen capture), or the like. In an embodiment, the client 110 can disable the presentation of graphical and/or audio content of the client's 110 live video feed, for example, using the option buttons 230. In an embodiment, the client 110 can change the camera used to generate the live video feed, such as switching from a front-facing camera to a rear-facing camera of the client 110.

The settings buttons 220 control settings of the game mediator 112. For example, in some embodiments, upon selection of a setting button 220 by the client 110, the game mediator 112 loads a settings page. At the settings page, one or more settings may be adjusted using the client 110, such as enabling or disabling the transmission of audio and/or graphical content by the client 110, changing the camera used to generate the live video feed, muting one or more incoming live video feeds from other clients 110 joined to the lobby, and so on.

The games buttons 230 control game selection in the game mediator 112. For example, upon selection of the games button 230 by the user of the client 110, the game mediator 112 loads a games page listing the games available for play. At the games page, a game may be selected using the client 110. For example, the games page may include a list of available games, including for each listed game a game title, a game icon or image, a game summary, and/or an on-screen button to select the game. For example, a listed game may have title "Fortnite™," an image of a game character, and a summary "compete in a battle royale." In an embodiment, the games page further allows the client 110 to select a portion of the game they wish to play, such as a track where they wish to race within a car racing game, or a location upon a map where a user character should be placed upon loading.

Upon selection of a game by the client 110, the game mediator 112 configures the lobby to attain a look and feel of the selected game based on one or more features of the game. The lobby may be configured to display graphical and/or textual elements of the game, such as a logo, a color scheme, one or more images from the game, and so on. For example, if "Fortnite™" is selected, an image from the game of a game character may be displayed with the "Fortnite™" logo overlaid (e.g., as game logo 320 in FIG. 3). Other aspects of the lobby, such as video panes 210, may adjust to accommodate the configuration, as seen in FIG. 3, which illustrates a simplified example of a lobby according to a second embodiment.

FIG. 3 illustrates a different state of the lobby, e.g. after a game has been selected. FIG. 3 includes a game image 310, a game logo 320, option buttons 330, a video pane 340, and a launch button 350. The game image 310 is an image from game A, such as a game character holding a sword in a game landscape. The game logo 320 is the stylized title of the game, such as how it may appear in-game at a title screen. The option buttons 330 allow one or more settings to be adjusted, such as the transmission of audio and/or graphical content as part of a live video feed.

The video pane 340 is a video pane similar to video pane 210, though possibly of different dimensions. In an embodiment, each client 110 joined to the lobby is associated with a video pane that displays the associated client's 110 live video feed. In an embodiment, there are as many video panes as there are allowed players for the game, and if there are fewer clients 110 joined to the lobby than there are allowed players for the game, unused video panes include an icon, such as a "+" icon, which the client 110 may select to access an invitation page as detailed below. The launch button 350 prompts the game mediator 112 to launch a gameplay session, e.g., to initiate execution of the gameplay session.

Returning to FIG. 2, the invite button 240 controls invitation of clients 110 to the lobby, according to one embodiment. For example, upon selection of the invite button 240 by the client, the game mediator 112 loads an invitation page enabling a user of the client 110 to send invitations to join the lobby to other clients 110. For example, the invitation page may include a list of invitation techniques, including for each listed technique a technique title and a technique icon. For example, an iMessage™ listed technique may include the title "iMessage™" and an iMessage™ icon. The invitation page may also include a list of clients 110 to whom an invitation may be sent, each listed client 110 including, for example, a name. Upon selection of one or more clients 110 for invitation and selection of one or more invitation techniques, the game mediator 112 generates an invitation message and configures the selected invitation techniques such that the invitation message may be sent. For example, if the invitation technique is a text message and the invitee is a client 110 associated with the name "Justin," the game mediator 112 generates a textual invitation message, opens a text message application upon the client 110, addresses the text to the invitee, and displays the invitation message in a message portion of the text message application. The client 110 may then send the invitation to the invitee using a button of the text message application.

The joined icon 250 indicates a number of clients 110 joined to the lobby. In the example of FIG. 2, there are two clients 110 joined to the lobby, hence the joined icon 250 indicates "2." In other embodiments, other icons may be present, as well as other buttons, graphical, and/or audio content. For example, the lobby may be configured to display a text string for each client 110 in the lobby indicating a name associated with the client 110. In an embodiment the lobby may include a list of other clients 110 that are playing games or are preparing to play games, which the client 110 may select to join another client's 110 lobby and/or gameplay session.

In an embodiment, the lobby may be configured to allow the client 110 to initiate live streams of gameplay, using, for example, a livestream product such as Facebook Live™ YouTube™, or Twitch™. A live stream of gameplay involves sending a video of gameplay as seen on the screen of a client 110 playing in the gameplay session to a client 110 not playing in the gameplay session. Furthermore, clients 110 joined to the lobby or who select the lobby may choose to view the live stream, rather than participate in the gameplay session. For example, if a game allows a maximum of four players and a fifth client 110 joints the lobby, the fifth client 110 may choose to livestream the gameplay session despite being unable to play.

In an embodiment, a first client 110 may invite one or more additional clients 110 to a gameplay session using the game mediator 112 via the game mediator server 130 (e.g., using the invite button 240 in the embodiment of FIG. 2). Upon receipt of an invitation, the game mediator 112 of each additional client prompts a user of the additional client 110 to either accept or reject the invitation. If the invitation is accepted, the game mediator server 130 may further interact with each accepting client 110 to enable participation in the gameplay session. Furthermore, if the invitation is accepted, the respective client 110 is added to the lobby, for example, gaining the ability to participate in the chatroom or other communications functionality.

Returning to FIG. 1, the electronic game 114 interacts with the game mediator 112 to provide gameplay sessions to users of clients 110. The game 114 may be a dedicated software application built natively to run on the operating system of the client 110, code (e.g., HTML 5 code) running within a game playing engine, such as (in some embodiments) the game mediator 112, a game built with a framework such as React Native™, or the like. A gameplay session involves one or more users interacting with respective clients 110 to play a set of instances of the game 114 in coordination with each other. In multiplayer gameplay sessions, multiple clients 110 participate in a single gameplay session, interactively playing the same game. In single player gameplay sessions, one client 110 participates in a single gameplay session. In some embodiments, the game 114 runs on the game mediator server 130, and is accessed using the client 110, which provides an interface to play the game 114. For example, the game 114 executes upon the game mediator server 130, which sends the results of the execution of the game 114 to the clients 110. The clients 110 interact with the results of the execution that are received from the game mediator server 130 and send the interactions to the game mediator server 130, which impact the execution of the game 114. The gameplay session may progress in this back and forth manner.

There may be different types of games, and the game mediator 112 and/or game mediator server 130 may support different types of games differently. One embodiment includes instant games and downloadable games. In such an embodiment, instant games can be played without downloading additional software. For example, the instant game may be at least partially integrated into the game mediator 112 such that the client 110 can launch a game without prior installation of additional software. If the client 110 launches a gameplay session using the game mediator 112 for an instant game, the game mediator 112 does not check whether the client 110 has the game installed. In contrast, downloadable games require the downloading of the game by the client 110 before a gameplay session can be launched. If the client 110 launches a gameplay session using the game mediator 112 for a downloadable game, the game mediator 112 may check if the client 110 has the game installed.

The game mediator server 130 interacts with the clients 110 to support the operation of the game mediator 112. The game mediator server 130 configures the lobby launched by the game mediator 112 according to specifics of the game 114 launched in conjunction with the lobby. For example, the lobby may be configured to show which players are prepared to play a particular game, allow a user to invite other players or to initiate a live stream of game play, and to allow a user to enable configuration of gameplay settings specific to the game 114 (such as selecting a character to use, or arena in which to play).

Upon receiving a command to launch a gameplay session, the game mediator 112 alerts the game mediator server 130, which checks each client 110 involved in the gameplay session, e.g., by querying its game mediator 112. If a certain client 110 involved in the gameplay session does not have the game 114 installed, the game mediator server 130 sends a deep link to the client 110, e.g., a deep link corresponding to an application store such as Apple App Store™ or Google Play Store™. The deep link then initiates installation of the game on the certain client 110 without exiting the game mediator 112. Alternatively, the deep link is sent to each client 110 involved in the gameplay session regardless of whether the client 110 has the game installed or not. If the game is not installed, the deep link facilitates the installation of the game without the user leaving the lobby. The deep link may be a uniform resource locator (URL). In an embodiment, the deep link directs the client 110 to open an application vendor (e.g., an application store) to a page where the game may be downloaded, for example, in a web view of the game mediator 112. For example, the deep link includes an identifier associated with the page of the application vendor that is used by the client 110 to navigate to the page. In another embodiment, the deep link facilitates checking whether the game 114 includes a game mediator library 115. If client 110 and/or game mediator server 130, facilitated by the deep link, determines the game has the library 115, it transfers functionality to the game; for example, it may transfer voice and/or video stream controls to the game. Such a transfer allows the user to control various aspects of voice and/or video during gameplay without having to return to the lobby. In other embodiments, other functionality may be transferred to the game, such as livestream functionality, game invitation functionality, and so on. In such embodiments, one or more graphical elements, such as on-screen buttons with which a client 110 may interact to control functionality passed to the game, may be overlaid upon the game as it is displayed in the course of the gameplay session. (The graphical user interface elements overlaid upon the game by the game mediator 112 or the game mediator library 115 are hereinafter referred to as the "overlay".) Furthermore, launching the game itself may involve the use of a deep link to access the game directly from the game mediator 112.

Furthermore, in some embodiments the game mediator server 130 checks the state of the lobby and, depending upon the number of clients 110 participating in the lobby, suggests to the client 110 who invited the others that more clients 110 could be invited. In an embodiment, the game mediator server 130 hosts the lobby. In an embodiment, when the game mediator server 130 configures the lobby according to the specifics of the game 114, the game 114 specifies the number of players required to play the game, to which the lobby adapts. For example, the lobby adapts to not launch a gameplay session until the required number of players are in the lobby. In an embodiment, if the minimum number of players are not present in the lobby to launch a gameplay session, the lobby prompts the players to invite others. Furthermore, the lobby may be configured to display as many video panes as the game allows.

In some embodiments, lobbies may be private or public. In an embodiment, the player who created the gameplay session sets the lobby as private or public. A public lobby is discoverable by users who wish to join a game. A private lobby is accessible only via invitation. Furthermore, the lobby may be configured to allow players who join the lobby to elect to participate in the gameplay session as spectators. Spectators watch gameplay but do not themselves play. If a game has reached its maximum number of players, additional players may only participate as spectators.

The game mediator server 130 proceeds to launch the game after receiving notifications that each client 110 that was sent a deep link installed the game and receiving a notification that the client 110 that commanded launching the gameplay session declined to invite more clients 110. In an embodiment, the game is hosted on the game server 140, and the game mediator server 130 sends the game server 140 parameters associated with the gameplay session, such as a session identifier, as well as parameters associated with each client 110, such as client identifiers. In other embodiments, parameters associated with the gameplay session are sent to one or more other destinations to coordinate game play.

The game mediator 112 uses the client 110 functionality to enhance gameplay. The game mediator 112 may enable actions within the game mediator 112, such as in the lobby, to affect gameplay, or may enable actions within the game to affect the lobby. The game mediator 112 has access to the functionality of the client 110, further detailed in FIG. 4 below. Games such as the game 114 may use the functionality of the client 110 via the game mediator 112 by way of the game mediator library 115. For example, games may access video content of the clients 110 using the live video streams of the clients 110 in the lobby participating in the gameplay session.

The game mediator 112 may enhance gameplay using the audio content of live video streams of the clients 110 in the lobby participating in the gameplay session. Game events may be associated with audio cues, which the game mediator 112 detects and communicates to the game 114 via the game mediator library 115. Game events are associated with audio cues on a subscription basis. For example, in a charades game, each word in a set of candidate words is subscribed to a different audio cue which the game mediator 112 is set to detect depending upon which word is being guessed. If the word is "car," for example, the game mediator 112 listens for the word "car" and informs the charades game that it has been spoken. In an embodiment, the game mediator 112 also informs the game 114 which client 110 produced the audio cue. The audio content may also be used for voice recognition. For example, if multiple players are speaking, and one says the correct keyword, the correct player is awarded a point.

In some embodiments, the graphical content of live video streams of the clients 110 in the lobby participating in the gameplay session may be used for gesture recognition to enrich gameplay, i.e., detecting (or subscribing to and then being notified by the game mediator 112 of) certain gestures, such as smiles, and awarding points to appropriately gesturing users within a game 114 responsive to detection of those gestures. As another example, if a particular client 110 participating in a gameplay session chooses to overlay a graphic of a wolf's face upon its video pane in the lobby, its character within the game 114 could likewise gain a wolf façade.

In an embodiment, the game mediator server 130 uses external live streaming, rather than the content of live video streams within the lobby, to enhance gameplay. For example, in a pictorial guessing game, the livestream (such as on Facebook Live™ or Twitch™) may be used for players, i.e. viewers of the livestream, to guess what the picture is. The game 114 subscribes to the game mediator 112 to listen for certain keywords, and upon detection of those keywords, awards points appropriately to the participant who guessed correctly by saying the keyword, similar to the use of audio content of the live video streams of the clients 110 in the lobby.

In some embodiments, the game mediation infrastructure provides enriched gameplay functionality by enabling game events to affect the lobby. This is discussed in more detail below with respect to FIGS. 5 and 6.

In some embodiments, the game 114 is hosted by the game server 140, which runs the gameplay session. Each game 114 interacts with the game that is run on the game server 140 to generate the game experience on the clients 110. For example, if a user playing a game 114 on a client 110 performs an action within the game 114, the action is communicated to the game server 140, which handles that action and applies it to the corresponding game session, populating that action and its effects to any other clients 110/game mediators 112 that are participating in that session. Upon occurrence of events associated with enriched gameplay functionality (such as an in-game interaction with a certain game character), the game server 140 notifies the game mediator server 130 of the event and the client 110 that triggered the event. In an embodiment, the game mediator server 130 tracks the game session and identifies events with enriched gameplay functionality.

The network 120 enables communications among the clients 110, the game mediator server 130, and the game server 140, and can comprise the Internet as well as mobile telephone networks. In one embodiment, the network 120 uses standard communications technologies and/or protocols. The data exchanged over the network 120 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. The entities can use custom and/or dedicated data communications technologies instead of, or in addition to, the ones described above.

Figure 4:
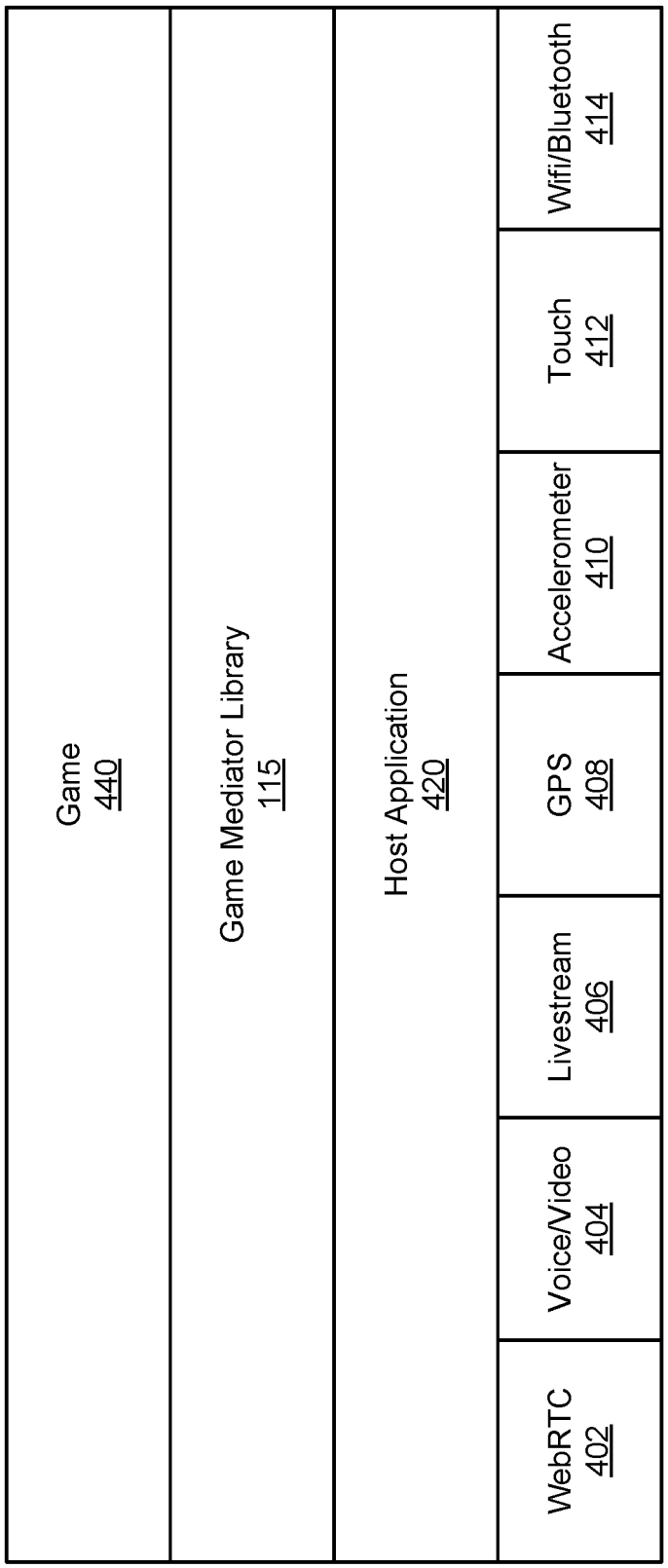
FIG. 4 is a high-level block diagram of the software stack upon which the game mediation infrastructure operates, in one embodiment.

FIG. 4 is a high-level block diagram of the software stack upon which the game mediation infrastructure operates, in one embodiment. At a first or bottom layer reside software components that drive low level functionality including hardware functionality, including WebRTC 402, Voice/Video 404, Livestream 406, GPS 408, Accelerometer 410, Touch 412, and Wifi/Bluetooth 414. At a second layer resides software that drives a host application 420, such as an operating system. At a third layer resides the game mediator library 115 (or its equivalent within the game mediator 112). At a fourth or top layer resides a game 440 (e.g., a game 114 of FIG. 1).

The WebRTC 402 component enables web browsers to communicate in real time. The Voice/Video 404 component enables use of audio and/or video capabilities of the client device 110. The Livestream 406 component allows for communication of video in real time. The GPS 408 component provides location information of the client device 110. The Accelerometer 410 component provides acceleration information of the client device 110. The Touch 412 component enables touch input to the client device 110. The Wifi/Bluetooth 414 component enables Wifi and/or Bluetooth functionality to the client device 110.

The host application 420 manages operation of the client 110 and its software and hardware components. The game mediator library 115 (in embodiments in which it is employed) provides a software framework used by the game mediator 112 and/or the game 440 (e.g., game 114 of FIG. 1), allowing for the interactivity needed to enable mediated and/or enriched gameplay sessions. In some embodiments, the game mediator 112 and game 440 are managed by the host application 420. For example, the host application 420 allocates memory for both the game mediator 112 and the game 440.

In the above description, some actions are performed by the game mediators 112. In embodiments making game mediator libraries 115 available for inclusion within the games 114 themselves, some of these actions may instead be performed by the game mediator libraries 115 included within the games. In some embodiments, whether a given action is performed by the game mediator 112 or the game mediator library 115 varies. For example, in some embodiments the game mediator library 115 can perform functionality discussed above as being performed by the game mediator 112, possibly in more lightweight form. For example, the game mediator library 115 could show a user interface for establishing a multiplayer gaming session and inviting participants within the game 114 itself, rather than using a separate user interface of the game mediator 112 for that purpose.

Figure 5:
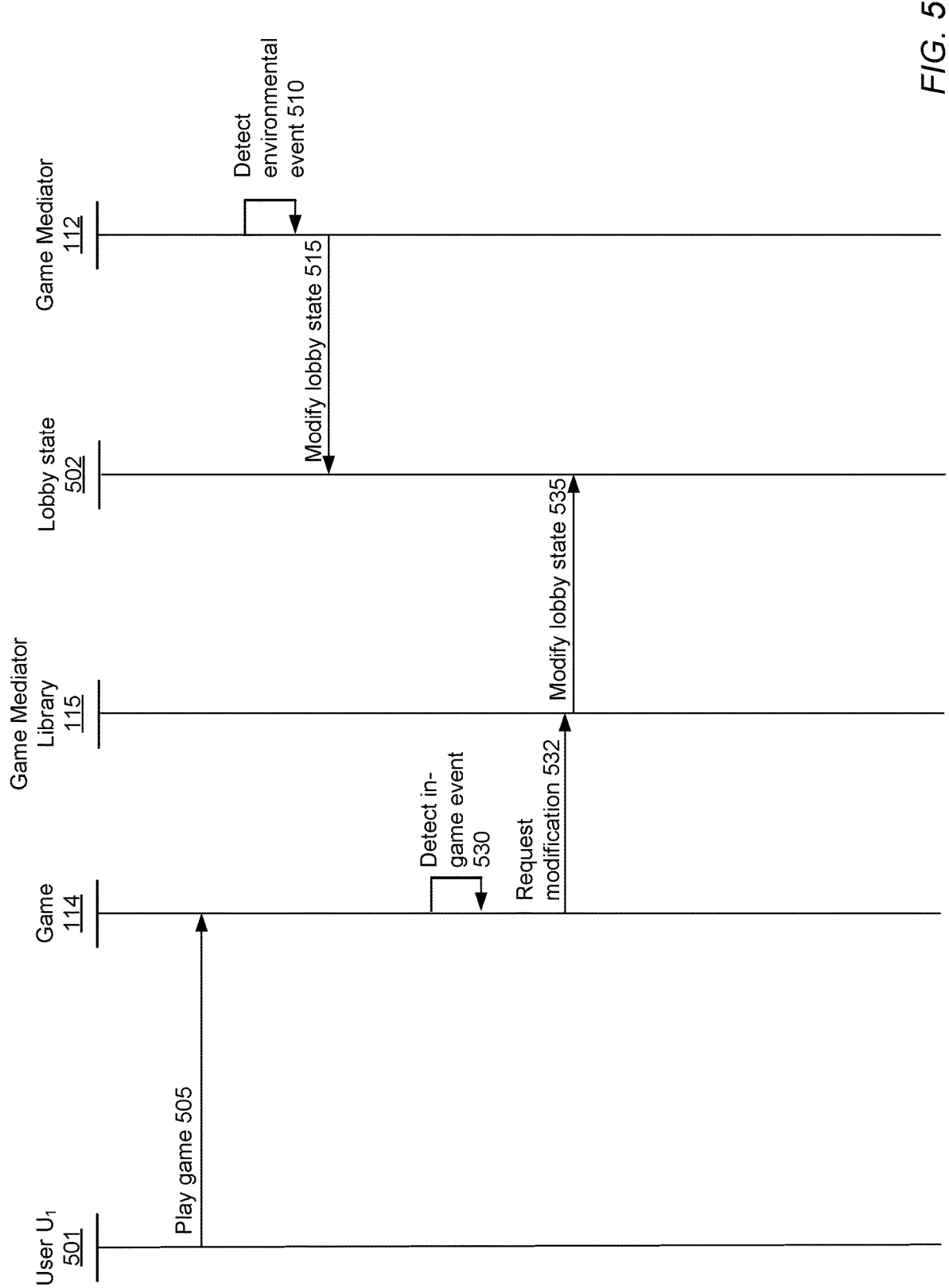
FIG. 5 illustrates interactions between the various components of FIG. 1 when modifying the state of the lobby or taking other actions based on game-related events, according to some embodiments.

FIG. 5 illustrates interactions between the various components of FIG. 1 when modifying the state of the lobby or taking other actions based on game-related events, according to some embodiments.

Initially, the user 501 is playing 505 the electronic game 114. Subsequently, as the user is playing 505, an event happens and is detected by a game mediation component (the game mediator 112, or the game mediator library 115, if any) or by the logic of the electronic game 114 itself, leading to the game mediation component taking an action. Events leading to taking actions (such as modification of the state of lobby) may be either "environmental" events to which the game mediation component has access, such as aural, visual, or movement inputs from sensors of the client device, or "in-game" events defined by the internal logic of the game itself. The game mediator 112 can detect environmental events through, for example, obtaining information about the state of the client device sensors from the operating system of the client device. The electronic game 114—either directly, or through its incorporated game mediator library 115, if any—can also detect environmental events, but can also detect the in-game events with its own internal logic. The environmental events that can be detected include, but are not limited to, events derived from client device sensors, such as microphone sensor data (from which semantic events such as yelling or clapping may be inferred), movement sensor data such as acceleration and rotation (from which semantic events such as dancing or hopping may be inferred), touchscreen sensor data (from which semantic events such as gestures, interactions with the lobby user interface, and the like may be inferred). The in-game events are events of significance within the game itself, and (depending on the game) could include occurrences such as (within the game) a player being attacked, a player being defeated, a player wining, the current game objective being completed. Other examples of in-game events include situations occurring between players within the game, such as the in-game character of one player coming within the field of view of the in-game character of the other player. For example, in a first-person shooter game, a first player's character might be looking in a certain direction and emerge from behind a wall, resulting in a second player's character being within the field of view of the first player and hence able to be attacked by the first player.

Upon detection 510 of an environmental event by the game mediator 512, or detection 530 an in-game (or environmental) event by the electronic 114 game, the event is raised. In some embodiments, the event is raised through an asynchronous event-handling interface defined by the game mediation infrastructure and called by the game 114; in other embodiments, the event is raised by the game 114 directly calling an appropriate function of the game mediator library 115 (e.g., a function to emphasize a video feed of a particular player, in response to that player's character being defeated in the game).

In response to the detection 510, 530 of the event, an action is taken by the game mediation infrastructure (that is, the game mediator 112, the game mediator library 115 (if any), and/or the game mediator server 130). In different embodiments, the actions include modification of a state of the lobby, such as the appearance or functionality of its overlay user interface that is superimposed upon the game display during gameplay, or interaction with the electronic game or a group gameplay session. Such interaction can include the communication amongst players in the group gameplay, the modification of the gameplay group (e.g., the invitation of another player to participate), and the ability to save and share portions of the gameplay for later viewing. These actions are now discussed in additional detail.

Figure 6:
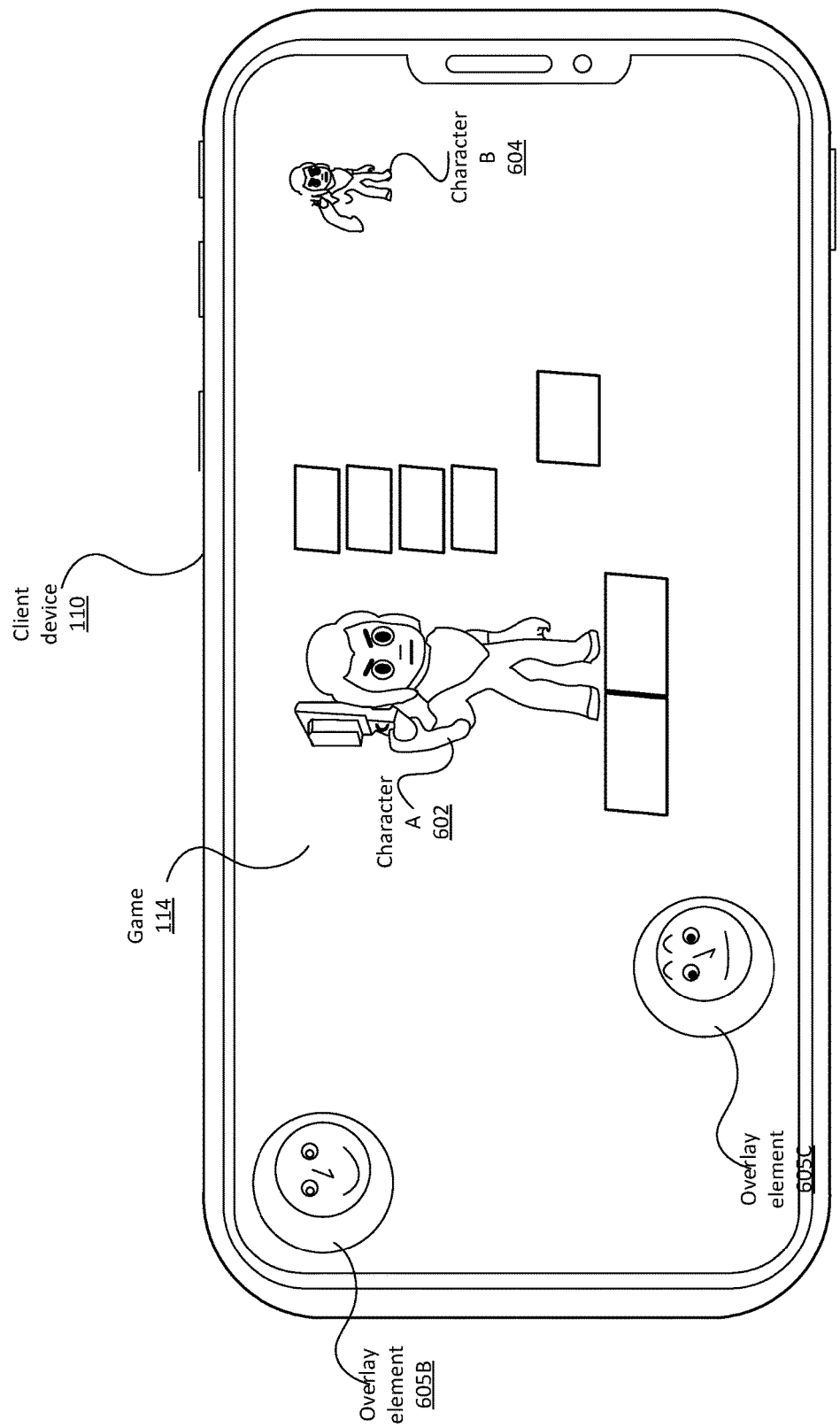
FIG. 6 illustrates visuals of a game being displayed on the screen of a client device during gameplay, according to one embodiment.

One type of action is modification of the state of the lobby, such as its overlay user interface. FIG. 6 illustrates visuals of a game 114 being displayed on the screen of a client device 110 during gameplay, according to one embodiment. Specifically, FIG. 6 illustrates a simplified representation of a shooting game. The game 114 is displaying the character 602 for the player of the game, and also a second character 604 for another player, indicating that the characters are nearby within the game. In the example of FIG. 6, the lobby's overlay user interface contains two elements: a video feed 605B for the player corresponding to the character 604, and a video feed 605C for another player also playing the game with them. The video feeds allows players to see the real-time image and reaction of other players as the game is being played. Because the video feeds 605 at least partially obscure the display of the game 114, the player can move the overlay elements, e.g., by pressing and dragging on them to move them to a less relevant portion of the screen. In some embodiments, in order to minimize the amount of screen space used by the overlay, the game mediation component (the game mediator 112 or game mediator library 115) displays video feeds for only a subset of the other players playing the game, and this may be adjusted in response to events so as to prioritize display of players who are more immediately relevant in the game as defined by the events. For example, if character 602 moves out from behind a wall and character 604 comes within its field of view within the game, the game 114 upon detecting this in-game event could request the game mediation component to prioritize the video feed for the player corresponding to the character 604 so that the first player can watch in real time the player who he can now attack, e.g., displacing a video feed for a different player who is currently of less relevance to the first player. The relevance of another player for this purpose can also be defined by environmental events, such as whether that player is yelling, moving vigorously or otherwise significantly (e.g., over some threshold degree of a movement metric), or otherwise behaving in a manner indicating excitement. As another example, instead of entirely hiding or showing video fees, the action could be to change their opacity depending upon a current relevance of their associated players, with less relevant players having video feeds with less opacity, or to change their sizes, with less relevant players having video feeds occupying less space. In some embodiments, other environmental events, such as the player pressing one of the video feeds 605, trigger display of a more complete overlay interface with additional controls, such as those for volume adjustment, for sending an invitation to an additional player to join the gameplay, opening the game mediator 112 (if installed), or the like.

Another type of action taken in response to an event is communication with other players in the group gameplay. Environmental events indicating a desire to communicate with another player, such as a user pressing on the video feed of another player, or an explicit selection of a message user interface element within the overlay user interface, can lead to the sending of messages such as images, emoticons/emojis, or the like. The messages can be displayed within the overlay user interface (e.g., visually associated with a video feed for the player that sent the message).

Still another type of action taken in response to an event deals with the designation, saving (e.g., as a video of gameplay actions occurring on the screen of one of the client devices 110), and/or sharing of portions of the gameplay. Environmental events may designate the portion of gameplay to be saved, such as explicit pressing of a "record" button within the overlay user interface. Environmental events may also be implicit, such as events indicating an unusual level of user engagement on the part of one or more of the users in the group gameplay, such as significant movement, yelling, or the like; these events may be used to indicate the beginning of portions of the gameplay to save, and a lack of such events may be used to indicate the end of the current portion to save. In-game events can also be used to indicate the portion of gameplay to save. For example, the logic of the game might detect that a new high score or some other notable accomplishment has been achieved, or is likely to be achieved soon, and cause the game mediation component to start to record gameplay at that point.

The game mediation component may also facilitate sharing saved portions of gameplay with others. For example, the game mediator 112 may make the saved portions available within its lobby user interface (e.g., a "Your greatest moments" collection associated with the various electronic games available to be played within the lobby), or may use the APIs of third-party social networking systems such as Facebook™ or Twitter™ to publish the saved gameplay, assuming that the player has configured the game mediation infrastructure to have knowledge of the player's credentials on those systems.

OTHER CONSIDERATIONS

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely for purposes of example, and is not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality. As used herein, the term "module" refers to computer program logic utilized to provide the specified functionality. Thus, a module can be implemented in hardware, firmware, and/or software.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for providing enhanced capabilities for group gameplay sessions of electronic games being played on client devices, the computer-implemented method comprising:
    creating an overlay user interface superimposed upon a display of an electronic game being played in a group gameplay session, the overlay user interface comprising video feeds of players in a session of the electronic game;
    monitoring occurrences of environmental events on a client device on which the electronic game is being played, the environmental events being external to the electronic game;
    identifying an occurrence of one of the monitored environmental events; and
    responsive to the identification, modifying, within the overlay user interface, a visual opacity of a video feed of one of the players in the session associated with the occurrence.

2. The computer-implemented method of claim 1, wherein the creating, monitoring, identifying, and modifying are performed by a game mediator executing in a process separate from a process in which the electronic game is executing.

3. The computer-implemented method of claim 1, wherein the creating, monitoring, identifying, and modifying are performed by a game mediator library linked into the electronic game.

4. The computer-implemented method of claim 3, wherein the electronic game additionally uses the game mediator library to perform at least one action responsive to the electronic game identifying an occurrence of at least one gameplay event internal to the electronic game.

5. The computer-implemented method of claim 4, wherein the gameplay event comprises at least one of: a player in the group gameplay session being attacked, the player being defeated, the player achieving an objective, or a current level of the electronic game being completed.

6. The computer-implemented method of claim 1, wherein the overlay user interface includes video of a plurality of players in the group gameplay session.

7. The computer-implemented method of claim 6, further comprising responsive to the identification of the occurrence of the event, visually emphasizing a video feed of one of the plurality of players.

8. The computer-implemented method of claim 7, wherein the gameplay event comprises an in-game character of the one of the plurality of players coming within a field of view of a character of another one of the plurality of players.

9. The computer-implemented method of claim 1, wherein the environmental event comprises at least one of: a player clapping, or a player moving vigorously.

10. The computer-implemented method of claim 1, further comprising saving a clip of gameplay from the group gameplay session.

11. The computer-implemented method of claim 10, further comprising:
    displaying the saved clip within a lobby user interface; and
    responsive to selection of the displayed saved clip, playing the saved clip.

12. The computer-implemented method of claim 1, further comprising posting a clip of gameplay from the group gameplay session to a third-party social networking system.

13. A non-transitory computer-readable storage medium storing instructions that when executed by a processor perform actions comprising:
    creating an overlay user interface superimposed upon a display of an electronic game being played in a group gameplay session, the overlay user interface comprising video feeds of players in a session of the electronic game;
    monitoring occurrences of environmental events on a client device on which the electronic game is being played, the environmental events being external to the electronic game;
    identifying an occurrence of one of the monitored environmental events; and
    responsive to the identification, modifying, within the overlay user interface, a visual opacity of a video feed of one of the players in the session associated with the occurrence.

14. The non-transitory computer-readable storage medium of claim 13, wherein the creating, monitoring, identifying, and modifying are performed by a game mediator executing in a process separate from a process in which the electronic game is executing.

15. The non-transitory computer-readable storage medium of claim 13, wherein the creating, monitoring, identifying, and modifying are performed by a game mediator library linked into the electronic game.

16. The non-transitory computer-readable storage medium of claim 15, wherein the electronic game additionally uses the game mediator library to perform at least one action responsive to the electronic game identifying an occurrence of at least one gameplay event internal to the electronic game.

17. The non-transitory computer-readable storage medium of claim 16, wherein the gameplay event comprises at least one of: a player in the group gameplay session being attacked, the player being defeated, the player achieving an objective, or a current level of the electronic game being completed.

18. The non-transitory computer-readable storage medium of claim 13, wherein the overlay user interface includes video of a plurality of players in the group gameplay session.

19. The non-transitory computer-readable storage medium of claim 18, the actions further comprising responsive to the identification of the occurrence of the event, visually emphasizing one of the plurality of players.

20. The non-transitory computer-readable storage medium of claim 13, the actions further comprising responsive to the identification of the occurrence of the event, modifying a visual opacity of the overlay user interface.

\* \* \* \* \*